United States Patent [19]

Nordengren

[11] 4,063,463
[45] Dec. 20, 1977

[54] METHOD OF FITTING A FILTER BELT TO A FILTER ASSEMBLY

[75] Inventor: Rolf Gunnar Jonas Nordengren, Landskrona, Sweden

[73] Assignee: Nordengren Patenter AB, Landskrona, Sweden

[21] Appl. No.: 720,720

[22] Filed: Sept. 7, 1976

[30] Foreign Application Priority Data

Sept. 5, 1975 Sweden .............................. 7509895
Dec. 12, 1975 Sweden .............................. 7514091

[51] Int. Cl.² .......................... F16G 1/00; F16G 5/00
[52] U.S. Cl. ................................................ 74/231 J
[58] Field of Search ......................... 74/231 J, 231 R

[56] References Cited

U.S. PATENT DOCUMENTS 2,318,287 5/1943 Brolin ................................. 74/231 J
3,988,940 11/1976 Szonn et al. ....................... 74/231 J

*Primary Examiner*—Leonard H. Gerin
*Attorney, Agent, or Firm*—Fred Philpitt

[57] ABSTRACT

The present invention is concerned with a method of fitting a belt to a filter assembly of the endless belt type having belt-tensioning means in which a belt blank, the end portions of which are at least only partially vulcanized and which have disposed therein recesses arranged to receive in friction locking manner connecting members having an end portion whose configuration corresponds to the configuration of its receiving recess, is placed in position in the assembly around said belt-tensioning means such that the ends of said belt lie adjacent each other, whereafter the connecting members are inserted in respective recesses to form an endless belt having a friction-locked joint, the ends of said belt are fully vulcanized, and the belt is tensioned.

The invention also encompasses a belt blank adapted to be used in the method as given above.

3 Claims, 6 Drawing Figures

METHOD OF FITTING A FILTER BELT TO A FILTER ASSEMBLY

The present invention relates to a method of fitting a filter belt to an endless-belt type filter assembly, and preferably a belt made of vulcanised rubber or similar material.

In heavy industry, it is often required to recover by filtration one product or substance from a mixture of different products or substances. One example of this is encountered in the manufacture of phosphoric acid, in which minerals rich in phosphorous, such as apatite, are reacted with a mineral acid, such as sulphuric acid. Such a reaction results in a mixture containing calcium sulphate (gypsum) and phosphoric acid. The resulting acid is normally separated from the calcium sulphate formed by means of an endless-belt type filter. Such a filter comprises a frame which carries the essential components of the assembly, these components comprising a rotatable belt, which is normally made of vulcanised rubber or some similar material, and a filter cloth arranged to be brought into contact with the belt during part of its rotation, during which part of said rotation the reaction mixture containing the liquid substance to be recovered, for example phosphoric acid, is applied to the upper surface of the filter cloth, whereupon the liquid material is caused to pass through openings in the filter cloth and the solid material is retained on the upper surface thereof.

In the following, the background of the invention will be described with reference to a filter particularly intended for the manufacture of phosphoric acid, by way of a typical example. In this particular case, the filter assembly comprises an endless belt made preferably of reinforced rubber or similar material. The belt is provided with transverse ribs and is mounted and arranged so as to move between two terminal rollers. The tension required in the belt during operation of the filter is provided by means of the two terminal rollers. The belt exhibits longitudinally extending edge portions with a ridge in each and every one of said portions. The vertical extension of the ridges is such that the shallow, groove-like space defined by the ribbed upper surface of the belt and the ridges are able to receive a filter cake having a thickness of up to about 100 mm, the thickness of said cake being uniform over the whole of the groove-like space. The ribbed belt is perforated along an imaginary line which extends centrally of the belt parallel with its longitudinal axis. The filter cloth rests against the ribs of the ribbed belt along the filtering zone of the filter assembly. During that phase of the movement of the rotating belt in which the belt returns, the filter cloth is completely separated from the belt. Cleaning of the belt and the filter cloth is simplified in this way, by spraying water thereon. During the phase of belt movement in which the cloth rests on the ribbed upper surface of the belt, the under surface of the belt is in sealing contact with a plurality of suction boxes which communicate with a source of vacuum. Liquid intended for recovery and washing liquid in other zones passes to the suction boxes and to a correction vessel through the openings under the influence of the vacuum.

The belt is made of rubber and is reinforced with cords made, for example, of Terylen ®. The incorporation of this reinforcement has enabled filters with extremely large filter surfaces to be constructed.

Such a belt presents a problem when mounting the belt to the filter assembly. Previously, the belt has been delivered ready for use in the form of an endless belt. Primarily this affords the advantage whereby all portions of the belt have the same mechanical strength, and that no weakening of the belt is introduced by causing disruption in the continuity of the reinforcing cords in the belt. Such a belt, however, can only be mounted to the assembly with great difficulty. For example in order to assemble the belt it is necessary to remove certain parts of the filter frame and to replace these parts once the belt has been filtered.

The rubber belt according to the present invention is delivered in the form of a strip of the same length as the desired length of the endless rotatable belt. Thus, the belt can be more readily assembled on the filter frame, since it is only necessary to pass one end of the belt over the terminal rollers and join the two ends of the belt together. To facilitate this a portion of each end of the belt is at least only partially vulcanised and is provided with recesses which correspond to projections on the opposing end of the belt. When joining the two ends of the belt together, the projections of one end portion are engaged in the recesses of the other. The ends of the projections are conveniently widened and the innermost portion of the recesses are, to a corresponding degree, undercut or formed such that co-acting parts lock each other when the ends of the belt are brought together.

The invention consists in a method of fitting a belt to a filter assembly of the endless belt type having belt-tensioning means in which a belt blank, the end portions of which are at least only partially vulcanised and which have disposed therein recesses arranged to receive in friction locking manner connecting members having an end portion whose configuration corresponds to the configuration of its receiving recess, is placed in position in the assembly around said belt-tensioning means such that the ends of said belt lie adjacent each other, whereafter the connecting members are inserted in respective recesses to form an endless belt having a friction-locked joint, the ends of said belt are fully vulcanised, and the belt is tensioned.

According to a variant of the method according to the invention, the undercut portions have an extension along an imaginary line which forms an angle with the longitudinal axis of the rotatable belt. In this way, the joint zone will only be subjected to one component of the tension force in the bolt during the movement thereof. This arrangement of mutually co-acting recesses and projections, in which the recesses are suitably undercut relative to the mouth portion of the recess at the end of the belt, compensates for the loss of mechanical strength in the belt as a result of interrupting the reinforcing cords at the jointing position. The ends of the belt provided with the mutually cooperating locking devices are then placed in a heating device which is arranged to supply the requisite amount of heat at the necessary temperature for finally vulcanising and joining together said ends. The belt, which now has the form of an endless belt, is then tensioned, for example by means of the devices provided for driving and holding the belt tensioned during its rotation, these means normally comprising rollers.

The connecting members may have the form of projections formed integrally with the belt blank or may be parts separate therefrom. In this latter case the recesses and connecting members may be of dumbell configuration and each alternate recess may be longer than the recess on either side thereof.

The recesses and connecting members may have any configuration which will provide a friction-locking joint, for example a dove-tail or key-hole configuration, or may extend obliquely to the longitudinal axis of the belt blank.

Suitably the connecting members have a widened or enlarged portion and the recesses are formed to receive said widened portion in a friction-locking manner.

So that the invention will be more readily understood and further features thereof made apparent, exemplary embodiments of the invention will now be described with reference to the accompanying drawing, in which.

Figure 1:
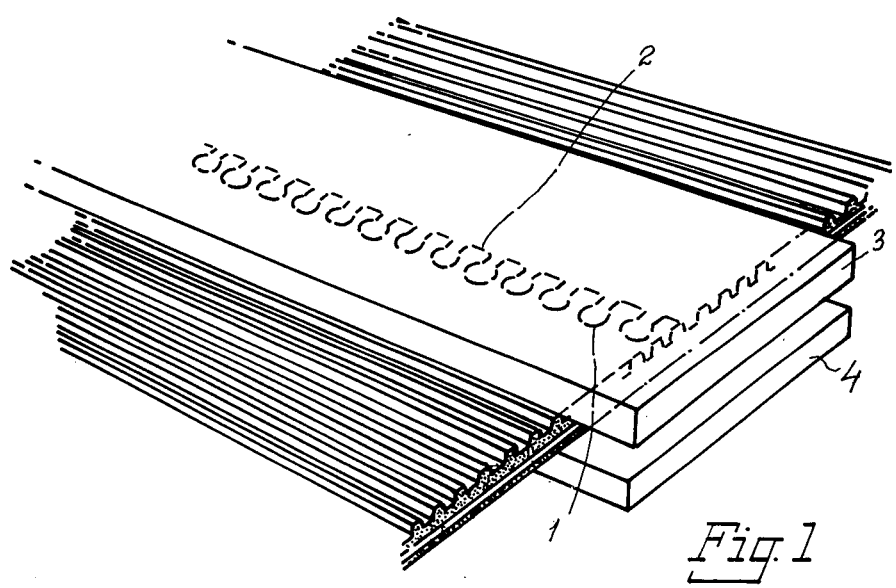
FIG. 1 shows the two ends of a rubber belt joined together prior to being vulcanised.

In FIG. 1 there is shown schematically a belt provided with transverse ribs and having ends 1 and 2 provided with recesses and projections arranged to co-act with said recesses to form a friction-locking joint. In the drawing, the belt is cut along a line in the longitudinal direction of the belt, to show the configuration of the ribs. The belt is provided with a longitudinally extending edge portion in the form of a ridge, the apex surface of which is somewhat higher than the level of the apex surface of the ribs, so that, in cross-section, the belt forms a shallow space for receiving the material to be filtered. Each end of the rubber belt according to the invention exhibits a portion which has not been fully vulcanised. The ends of the belt are now placed between two heating jaws 3 and 4 which are heated electrically for jointing the belt so as to form an endless belt, it being assumed that the belt has previously been assembled in the filter frame.

Figure 2:
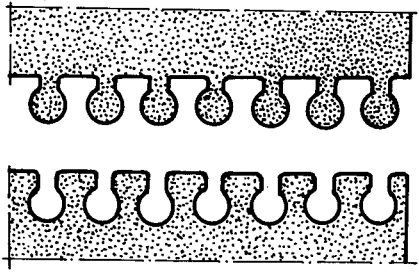
FIGS. 2, 3 and 4 show recesses and projections of different configuration, all of which will provide a friction-locking joint.

With the belt shown in FIG. 2, the projections have a circular, widened portion which is intended to engage in a respective corresponding recess, there being obtained when the ends are joined together a very strong joint which compensates for the loss in mechanical strength resulting from the fact that the reinforcing cord in the rubber has been broken at each particular end of the belt.

Figure 3:
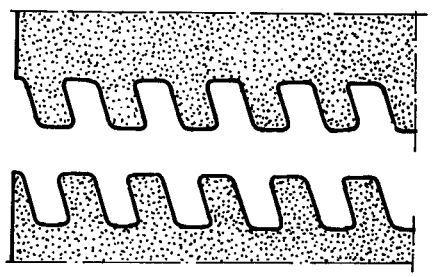

FIG. 3 shows an embodiment of the belt with obliquely positioned projections and corresponding obliquely positioned recesses. The longitudinal axis of each projection forms an oblique angle to the longitudinal direction of the belt.

Figure 4:
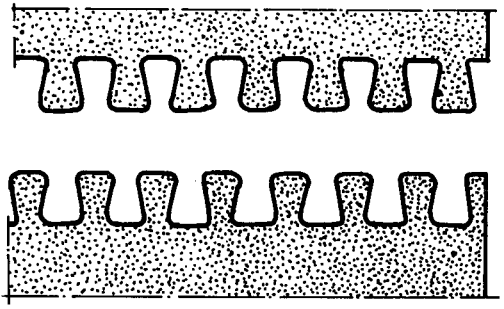

FIG. 4 shows a further variation of projections and recesses, in which the projection is continuously widened to the end thereof so as to obtain a dove-tail configuration. This configuration of projection and recess also provides a strong joint subsequent to the complete vulcanisation of the belt ends.

Figure 6:
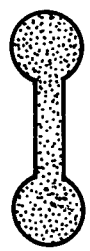
FIG. 6 shows a dumbell-shaped connecting member intended to fit into two opposing recesses of the FIG. 5 embodiment.
Figure 5:
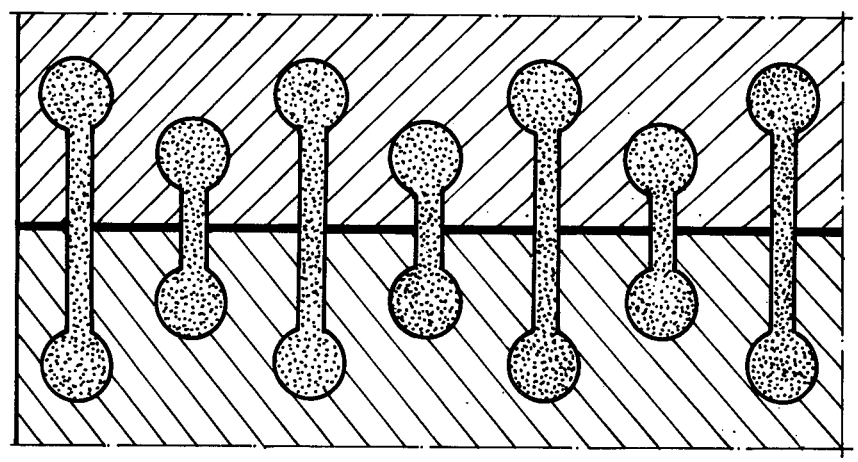
FIG. 5 is a top plan view of two mutually contacting ends of a rubber belt having dumbell shaped recesses in both ends thereof.

In the embodiment shown in FIG. 5, the ends 5 and 6 of the belt are each provided with pairs of mutually corresponding recesses 7. The pairs of recesses may have varying length so that each alternate pair is longer than the intermediate pair. The recesses are widened at the ends thereof so as to obtain a dumbell shape. FIG. 6 shows a dumbell shaped connecting piece 6 intended to fit in one pair of the recesses shown in FIG. 5. The connecting pieces are made of unvulcanised rubber and are intended to be vulcanised together with the ends of the belt to form a reinforced joint.

What is claimed is:

1. A belt blank having two end portions in which are disposed recesses arranged to receive in a friction-locking manner connecting members having at least one end of similar configuration to the configuration of said recesses so as to form an endless belt, wherein said recesses are disposed in both ends of the blank and arranged so that when the ends are brought together a pair of opposing recesses together have a dumbell configuration for receiving a connecting member, separate from said belt, of similar configuration.

2. A belt blank as set forth in claim 1 wherein the axial extension of one recess is greater than that of an adjacent recess.

3. A method of fitting a belt to a filter assembly of the endless belt type having belt-tensioning means in which a belt blank, the two end portions of which are at least only partially vulcanised and which have disposed therein recesses arranged to receive in friction locking manner connecting members having an end portion whose configuration corresponds to the configuration of its receiving recess, is placed in position in the assembly around said belt-tensioning means such that the ends of said belt lie adjacent each other, whereafter the connecting members are inserted in respective recesses to form an endless belt having a friction-locked joint, the ends of said belt are fully vulcanised, and the belt is tensioned, said recesses being disposed in both ends of the blank and arranged so that when the ends are brought together a pair of opposing recesses together have a dumbell configuration for receiving a connecting member, separate from said belt, of similar configuration.

* * * * *